United States Patent
Drake et al.

(10) Patent No.: US 9,237,511 B2
(45) Date of Patent: Jan. 12, 2016

(54) SYSTEM AND METHOD FOR ENABLING A VIEWABLE PAN ID OVER A WIRELESS PERSONAL AREA NETWORK

(75) Inventors: Jeff Donald Drake, Louisville, KY (US); Joseph Mark Brian, Louisville, KY (US)

(73) Assignee: General Electric Company, Schenectady, NY (US)

( * ) Notice: Subject to any disclaimer, the term of this patent is extended or adjusted under 35 U.S.C. 154(b) by 424 days.

(21) Appl. No.: 13/551,223

(22) Filed: Jul. 17, 2012

(65) Prior Publication Data

US 2014/0022935 A1    Jan. 23, 2014

(51) Int. Cl.
  *H04L 12/28*  (2006.01)
  *H04W 48/16*  (2009.01)

(52) U.S. Cl.
  CPC ..................... *H04W 48/16* (2013.01)

(58) Field of Classification Search
  None
  See application file for complete search history.

(56) References Cited

U.S. PATENT DOCUMENTS

| | | | |
|---|---|---|---|
| 2005/0090264 A1 | 4/2005 | Kim | |
| 2006/0294216 A1* | 12/2006 | Swanson et al. | 709/223 |
| 2008/0080456 A1 | 4/2008 | Williams | |
| 2008/0082543 A1* | 4/2008 | Abhishek et al. | 707/10 |
| 2008/0291855 A1 | 11/2008 | Bata et al. | |
| 2009/0262665 A1 | 10/2009 | Kim et al. | |
| 2010/0097986 A1* | 4/2010 | Ylitalo et al. | 370/328 |
| 2010/0114425 A1* | 5/2010 | Knapp et al. | 701/33 |

OTHER PUBLICATIONS

IBM Technical Disclosure Bulletin, Dec. 1992, US; TDB-ACC-No. NN9212254; vol. 35, Issue7, p. 254-255; Network Identifiers for the NETBIOS LAN Communication Protocol (Hereafter "IBM254").*

* cited by examiner

*Primary Examiner* — Steven H Nguyen
*Assistant Examiner* — Rual Rivas
(74) *Attorney, Agent, or Firm* — Dority & Manning, P.A.

(57) ABSTRACT

A system for enabling a viewable personal area network (PAN) identification (ID) over an wireless network. The system includes a coordinator configured to assign a PAN ID to an available PAN, a device configured to transmit and/or receive data using 802.15.4 protocol or equivalent, and at least one processor. The at least one processor is programmed to receive a request from the device to scan for an available wireless network, receive the assigned PAN ID based on the request, determine whether the PAN ID is a viewable PAN ID, and provide the PAN ID based on the determination.

9 Claims, 3 Drawing Sheets

SYSTEM AND METHOD FOR ENABLING A VIEWABLE PAN ID OVER A WIRELESS PERSONAL AREA NETWORK

BACKGROUND OF THE INVENTION

The field of the invention relates generally to computers, and more particularly to embodiments of a system and method for enabling a viewable personal area network (PAN) identification (ID) over a wireless personal area network.

The Institute of Electrical and Electronics Engineers (IEEE) 802.15 working group has set wireless personal area network (WPAN) as the standard of the short-distance wireless network, and has four task groups: IEEE 802.15.1 is well known as "BLUETOOTH®"; IEEE 802.15.3 and IEEE 802.15.3a establish protocols for high-rate WPANs; and IEEE 802.15.4, commonly known as ZIGBEE® (hereinafter "ZIGBEE") communication, establishes protocols for low-rate WPANs, which typically operate at speeds at or below 250 kbps.

Conventionally, ZIGBEE communication is performed in a relatively narrow range. Accordingly it can be used to establish a particular type of PAN that is different from a traditional local area network (LAN) or wide area network (WAN). However, unlike IEEE 802.11 that is a set of standards for implementing wireless local area network (WLAN) communication, the 15.4 networks (e.g., ZIGBEE enabled networks) do not have PAN Ids that humans can read and understand. Consequently, such PAN Ids are not "viewable".

Currently, when an end-device (e.g., a terminal) that is capable of performing ZIGBEE communication is located in an area where it can gain access to one or more ZIGBEE networks, the end-device itself selects and gains access to a particular ZIGBEE network from among multiple ZIGBEE networks. However, unlike 802.11 networks (e.g., WiFi), 802.15.4 networks, such as ZIGBEE, do not enable viewable PAN IDs. ZIGBEE devices are either preconfigured with a non-viewable PAN ID or each ZIGBEE device can discover nearby networks and automatically select a non-viewable PAN ID to join.

In addition, 802.15.4 networks are currently machine-to-machine networks, and thus, traditional 802.15.4 networks are not able to present a PAN ID in viewable form or even enable a user to select a PAN ID from a list of available PAN IDs since user involvement is minimized or even eliminated due to the machine-to-machine nature of conventional 802.15.4 network systems. Thus, when a PAN ID is identified, conventional 802.15.4 network systems automatically render PAN IDs to be non-viewable. Such non-viewable PAN IDs are generally 16 byte hexadecimal identifications. Such hexadecimal ids do not equate to American Standard Code for Information Interchange (ASCII), Universal Character Set Transformation Format 8-bit (UTF-8), or any other viewable data format.

BRIEF SUMMARY OF THE INVENTION

In one aspect, a system for enabling a viewable personal area network (PAN) identification (ID) over an 802.15.4 network is provided. As used herein, the terms "viewable personal area network (PAN) identification (ID)" or "viewable PAN Id" refer to and designate an identifier for use with a PAN, which identifier can be read and understood by humans. Stated differently, such identifier, in contrast to traditional PAN Id's, is human-readable, though it may also be machine-readable. The system includes a coordinator configured to assign a PAN ID to an available PAN, a device configured to transmit and/or receive data using the IEEE 802.15.4 protocol or equivalent, and at least one processor. The at least one processor is programmed to receive a request from the device to scan for an available IEEE 802.15.4 network or equivalent (hereinafter "802.15.4 network"), receive the assigned PAN ID based on the request, determine whether the received PAN ID is a viewable PAN ID, and provide the PAN ID based on the determination.

In another aspect, an apparatus configured to enable a viewable personal area network (PAN) identification (ID) over an 802.15.4 network is provided. The apparatus includes at least one processor programmed to receive a request to assign a viewable PAN ID to the 802.15.4 network, assign the viewable PAN ID to the 802.15.4 network, and provide the viewable PAN ID in a format that a human can read and/or understand.

In yet another aspect, a method for enabling a viewable personal area network (PAN) identification (ID) over an 802.15.4 network is provided. The method includes receiving a request from a device to scan for an available 802.15.4 network, receiving a PAN ID based on the request, determining whether the received PAN ID is a viewable PAN ID, and presenting the PAN ID based on the determination.

BRIEF DESCRIPTION OF THE DRAWINGS

The present disclosure is described in detail below with reference to the attached figures.

DETAILED DESCRIPTION OF THE INVENTION

Figure 1:
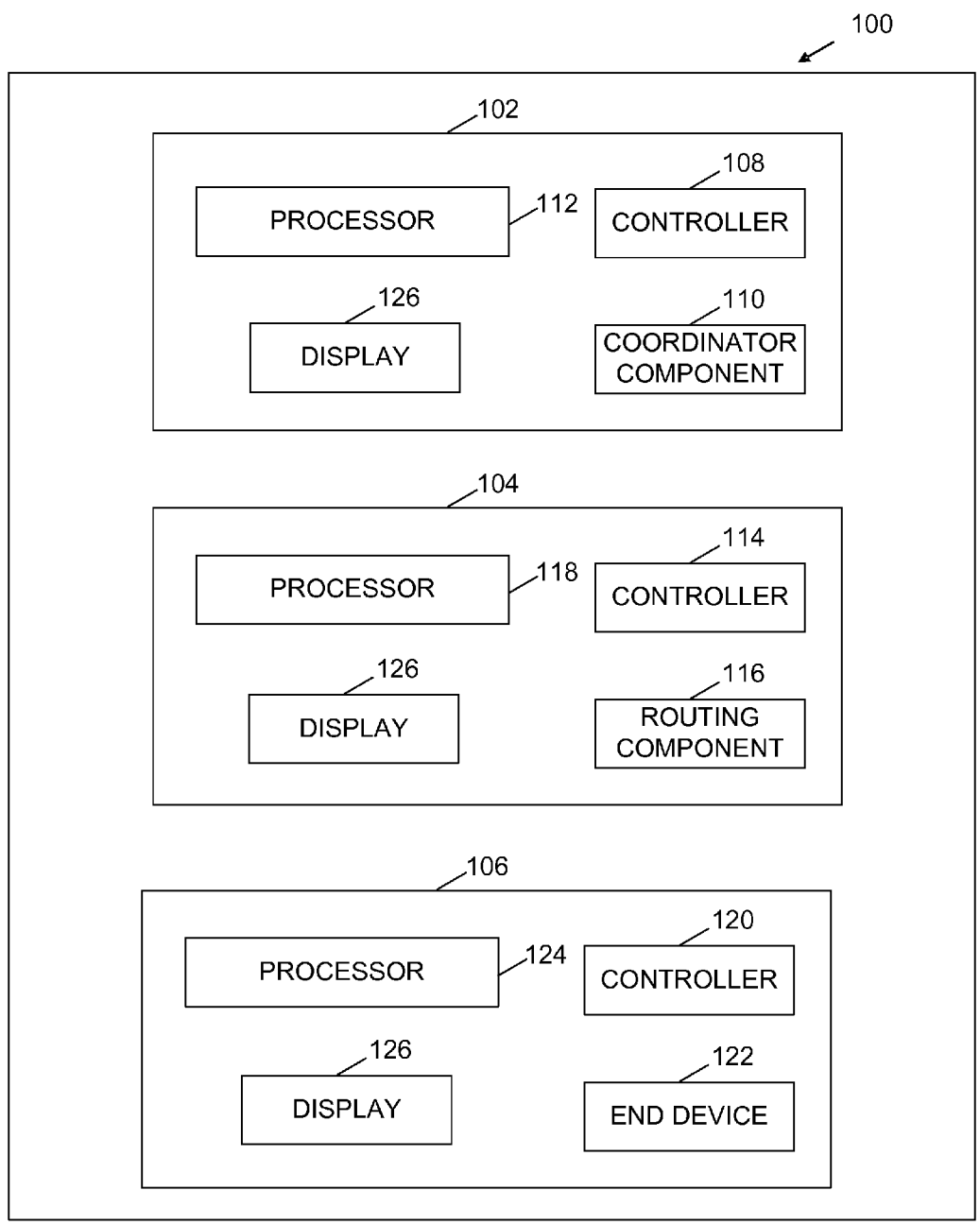
FIG. 1 is a block diagram of a system using a 802.15.4 communication network or equivalent.

With reference now to FIG. 1, a block diagram of a system 100 that enables viewable PAN IDs over an 802.15.4 network is provided. System 100 includes appliances 102, 104, and 106. Each of appliances 102, 104, and 106 may be an electric water heater, a washing machine, a dryer, a microwave, an oven, a refrigerator, and the like configured to communicate over a wireless network.

In one embodiment, appliance 102 includes a controller 108, a coordinator component 110, and at least one processor 112. Controller 108 controls operations of appliance 102 and coordinator component 110 operates as a PAN coordinator enabling appliance 102 to be a full functional device. For example, coordinator component 110 is configured to search for a suitable radio channel (e.g., a radio channel that has least activity) using 802.15.4 protocol, initiate an 802.15.4 network by assigning a PAN ID to a 802.15.4 network, and allow routers and end devices to join the PAN. The PAN ID can be predetermined, or the PAN ID can be obtained dynamically by detecting other networks operating in a same frequency channel thus enabling coordinator component 110 to choose a PAN ID that does not conflict with the other networks.

In one embodiment, appliance 104 includes a controller 114, a routing component 116, and at least one processor 118. Controller 114 controls operations of appliance 104 and routing component 116 operates as a routing device. As such, upon appliance 104 joining the PAN, routing component 116 is configured to allow other routers and end devices to join the PAN as well as assist coordinator component 110 in routing data.

Appliance 106 includes a controller 120, an end device 122, and at least one processor 124. Controller 120 controls operations of appliance 106 and end device 122 enables appliance 106 to transmit and receive radio frequency data with appliances 102 and 104 upon joining the PAN.

In one embodiment, one or more of appliances 102, 104, and 106 may include a display 126. Display 126 may be, for example, an LED or LCD that displays a user interface. Display 126 may act as a user input selection device providing user input functionality. In one embodiment, display 126 may be a capacitive touch screen display configured to be responsive to a user pressing contact on a screen to selectively perform functionality such as inputting installation signals for setting channels and PAN IDs of coordinator component 110. Thus, a user can operate the desired functions by contacting a surface of display 126 as well as other functions provided herein.

Processors 112, 118, and 124 execute computer-executable instructions for implementing aspects of the disclosure. In some embodiments, one or more of processors 112, 118, and 124 are transformed into special purpose microprocessors by executing computer-executable instructions or by otherwise being programmed. For example, one or more of processors 112, 118, and 124 may be programmed with instructions such as illustrated below with respect to FIG. 2.

As mentioned above, currently, 802.15.4 networks, such as ZIGBEE, do not enable viewable PAN IDs. However, embodiments of the present disclosure enable 802.15.4 networks and the devices associated therewith to assign a viewable PAN ID to a 802.15.4 network and present the PAN ID to a user in a viewable format.

Figure 2:
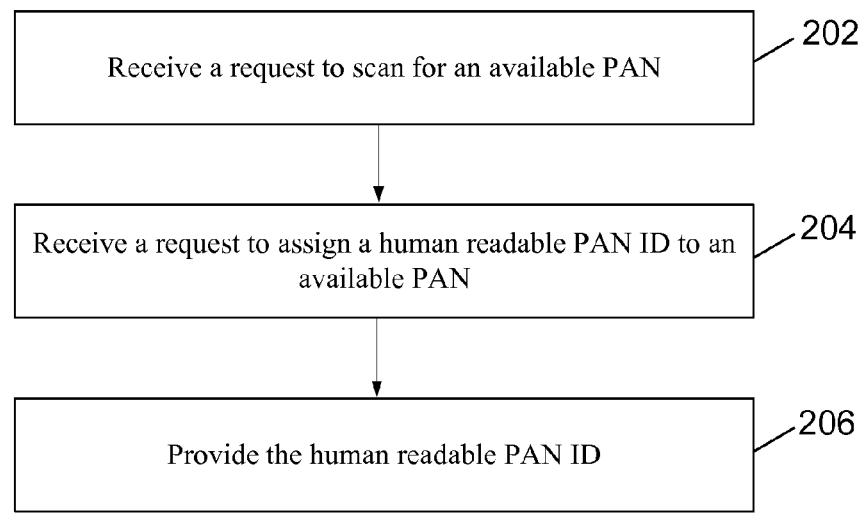
FIGS. 2 and 3 are process flow diagrams of a method for enabling a viewable personal area network (PAN) identification (ID) over a 802.15.4 network or equivalent.

Referring next to FIG. 2, an exemplary flow chart illustrates enabling a viewable PAN ID over an 802.15.4 network. At 202, a request to scan for an available PAN is received by, for example, coordinator component 110 (shown in FIG. 1). In one embodiment, a user initiates the request using user input functionality on display 126. At 204, a request to assign a viewable PAN ID to an available PAN is received. In one embodiment, the request includes text (e.g., eight characters) defining the viewable PAN ID and the request also includes which available PAN to apply the viewable PAN to.

Thus, upon receipt of one or more non-viewable PAN IDs, coordinator component 110 redefines a selected non-viewable PAN ID to be a viewable PAN ID configured to represent human-readable text, such as ASCII and/or UTF-8. One of ordinary skill in the art guided by the teachings herein will appreciate that several methods of changing a non-viewable PAN to a viewable PAN ID are within the scope of the present disclosure. Thus, once a PAN ID is in viewable form, the viewable PAN ID may be presented to a device requesting to join the PAN identified by the viewable PAN ID.

Figure 3:
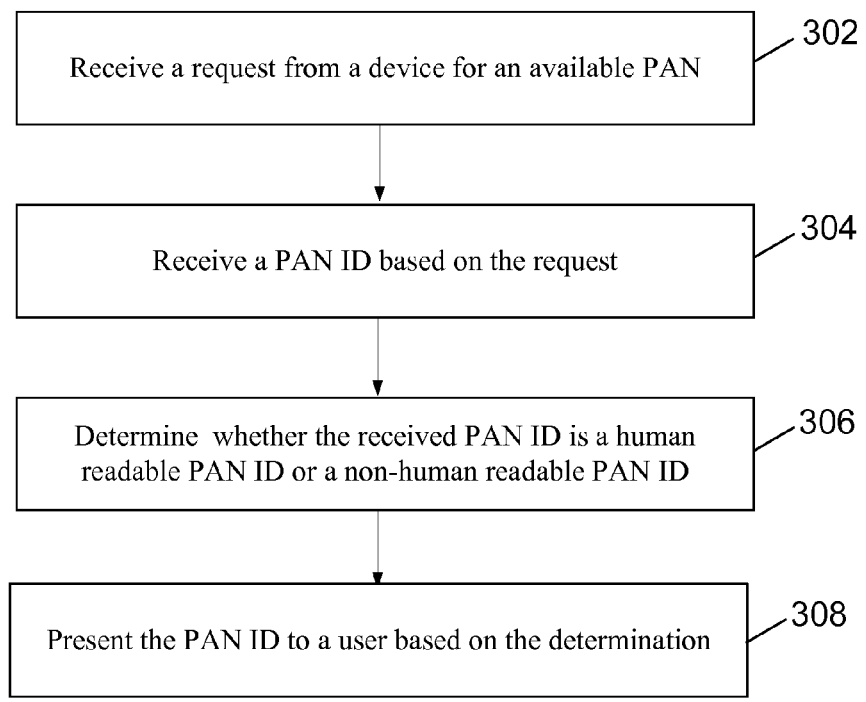

Referring next to FIG. 3, an exemplary flow chart illustrates enabling a device (such as appliances 104 and 106 in FIG. 1) to identify and present a viewable PAN ID to a user. At 302, a request from a device (e.g., appliance 104 or appliance 106) for an available PAN is received. At 304, a PAN ID is received based on the request. However, unlike conventional 802.15.4 network systems, a received PAN ID is not merely assumed to be non-viewable and therefore not presented to a user. Rather, at 306, a determination is made as to whether the received PAN ID is a viewable PAN ID or a non-viewable PAN ID. In one embodiment, to determine whether the received PAN ID is a viewable PAN ID or a non-viewable PAN ID, a checksum is performed on one or more characters in a character string of the received PAN ID to determine if an outcome of the checksum identifies the PAN ID as being viewable. At 308, the PAN ID is presented to a user based on the determination. For example, if the PAN ID is determined to be a viewable PAN ID, the PAN ID is presented to a user in a viewable format. However, if the PAN ID is determined to be a non-human PAN ID, the PAN ID is not presented. In this manner, a user may only be presented with viewable PAN IDs.

While embodiments of the disclosure are illustrated and described herein with reference to communication over an Institute of Electrical and Electronics Engineers (IEEE) 802.15.4 protocol, and more particularly, to a communication system using ZIGBEE to enable personal area network (PAN) identifications (IDs) of the communication terminals using a ZIGBEE wireless communication network to be viewable PAN IDs, aspects of the disclosure are operable with any system that performs the functionality illustrated and described herein, or its equivalent.

Exemplary Operating Environment

A controller or computing device such as described herein has one or more processors or processing units, system memory, and some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal, such as a carrier wave or other transport mechanism, and include any information delivery media. Combinations of any of the above are also included within the scope of computer readable media.

The controller/computer may operate in a networked environment using logical connections to one or more remote computers, such as a remote computer. Although described in connection with an exemplary computing system environment, embodiments of the present disclosure are operational with numerous other general purpose or special purpose computing system environments or configurations. The computing system environment is not intended to suggest any limitation as to the scope of use or functionality of any aspect of the present disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, tablet computers, distributed computing environments that include any of the above systems or devices, and the like.

Embodiments of the present disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the present disclosure may be implemented with any number and organization of such components or modules. For example, aspects of the present disclosure are not limited to the specific computer-executable instructions or the specific components or modules illustrated in the figures and described herein. Other embodiments of the present disclosure may include different computer-executable instructions or components having more or less functionality than illustrated and described herein. Aspects of the present disclosure may also be practiced in distributed computing environments where tasks are performed by remote processing devices that are linked through a communications network. In a distributed computing environment, program modules may be located in both local and remote computer storage media including memory storage devices.

Aspects of the present disclosure transform a general-purpose computer into a special-purpose computing device when configured to execute the instructions described herein.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the present disclosure in detail, it will be apparent that modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

This written description uses examples to disclose the claimed subject matter, including the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for enabling a viewable personal area network (PAN) identification (ID) over an 802.15.4 network, the system comprising:
    a coordinator component configured to initiate the formation of and assign a PAN ID to a PAN;
    a device configured to transmit or receive data using a wireless protocol and comprising at least one processor programmed to:
    request the PAN;
    receive the assigned PAN ID based on the request;
    determine whether the PAN ID is a viewable PAN ID or a non-viewable PAN ID by performing a checksum on one or more characters in a character string of the PAN ID;
    responsive to determining that the PAN ID is a viewable PAN ID, present the PAN ID to the user; and
    responsive to determining that the PAN ID is a non-viewable PAN ID, redefine the non-viewable PAN ID to be a viewable PAN ID and present the redefined PAN ID to the user,
    wherein a viewable PAN ID comprises a PAN ID in a human-readable format, the human readable format comprising one of an American Standard Code for Information Interchange (ASCII) format and a Universal Character Set Transformation Format (UTF), and
    wherein a non-viewable PAN ID comprises a PAN ID in a machine-readable format, the machine-readable format comprising a hexadecimal format.

2. The system of claim 1, further comprising a display configured to present the viewable PAN ID to a user.

3. An apparatus configured to enable a viewable personal area network (PAN) identification (ID) over a wireless network, the apparatus comprising
    at least one processor and memory storing instructions executable by the at least one processor to:
    receive a request to assign a PAN ID to the wireless network;
    determine whether the PAN ID is a viewable PAN ID or a non-viewable PAN ID by performing a checksum on one or more characters in a character string of the PAN ID;
    responsive to determining that the PAN ID is a viewable PAN ID, assign the viewable PAN ID to the wireless network;
    responsive to determining that the PAN ID is a non-viewable PAN ID, redefine the non-viewable PAN ID to be a viewable PAN ID and assign the redefined PAN ID to the wireless network; and
    provide the assigned PAN ID,
    wherein a viewable PAN ID comprises a PAN ID in a human readable format, the human readable format comprising one of an American Standard Code for Information Interchange (ASCII) format and a Universal Character Set Transformation Format (UTF), and
    wherein a non-viewable PAN ID comprises a PAN ID in a machine-readable format, the machine-readable format comprising a hexadecimal format.

4. The apparatus of claim 3, wherein redefining the non-viewable PAN ID comprises applying a cyclic redundancy check (CRC) to the non-viewable PAN ID, wherein the CRC enables the PAN ID to be identified as viewable.

5. The apparatus of claim 4, further comprising receiving text to be assigned as the viewable PAN ID, wherein the CRC is calculated from the received text.

6. A method for enabling a viewable personal area network (PAN) identification (ID) over a wireless network, the method comprising:
    receiving a request from a device to scan for an available wireless network;
    receiving a PAN ID based on the request;
    determining whether the PAN ID is a viewable PAN ID or a non-viewable PAN ID by performing a checksum on one or more characters in a character string of the PAN ID; and
    responsive to determining that the PAN ID is a viewable PAN ID, presenting the PAN ID
    responsive to determining that the PAN ID is a non-viewable PAN ID, redefining the non-viewable PAN ID to be a viewable PAN ID and presenting the redefined PAN ID to the user,
    wherein a viewable PAN ID comprises a PAN ID in a human-readable format, the human readable format comprising one of an American Standard Code for Information Interchange (ASCII) format and a Universal Character Set Transformation Format (UTF), and wherein a non-viewable PAN ID comprises a PAN ID in a machine-readable format, the machine-readable format comprising a hexadecimal format.

7. The method of claim 6, wherein presenting the PAN ID comprises presenting the viewable PAN ID with eight characters or less.

8. The method of claim 7, wherein determining whether the PAN ID is a viewable PAN ID comprises determining whether the PAN ID is a viewable PAN ID based on an outcome of the checksum.

9. The method of claim 6, wherein determining whether the PAN ID is a viewable PAN ID comprises appending the computed checksum on one or more characters at an end of the character string in the PAN ID.

\* \* \* \* \*